Sept. 18, 1956     M. PENNYBACKER ET AL     2,763,098
MACHINE FOR APPLYING TERMINALS TO GLASS TUBES
Filed June 2, 1953     2 Sheets-Sheet 1
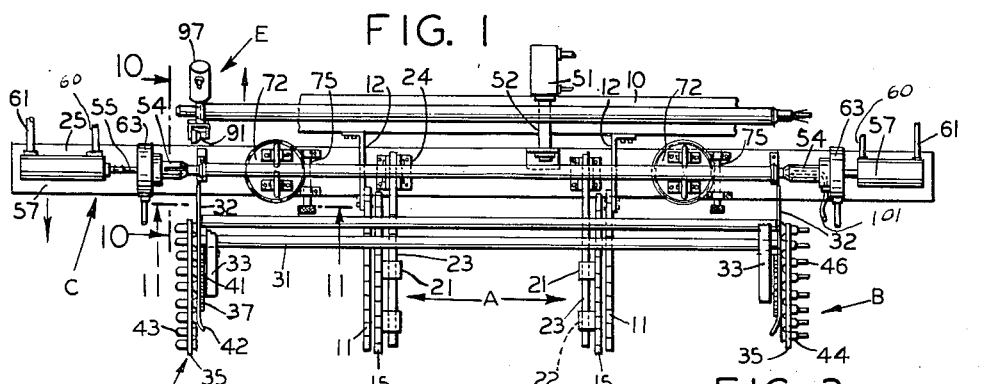
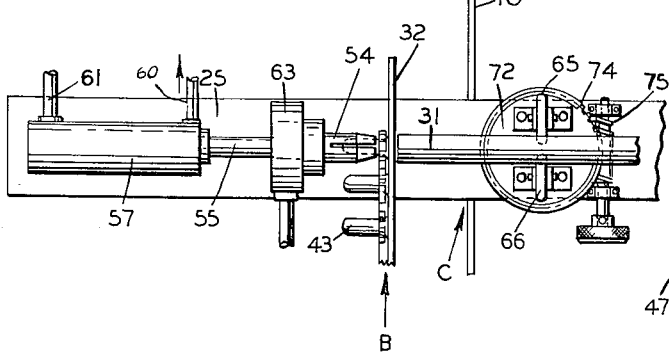
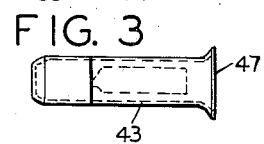
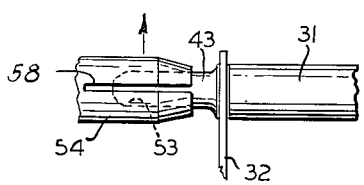
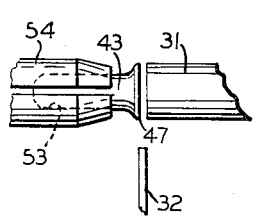
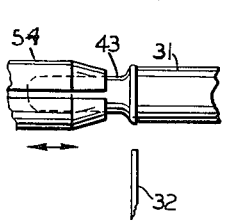
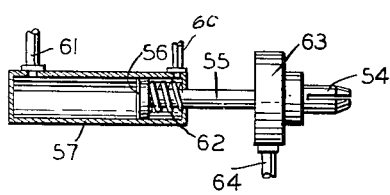
*INVENTOR.*
MILES PENNYBACKER
CHARLES A. SIMPSON
BY John P. Chandler
their ATTORNEY.

Sept. 18, 1956  M. PENNYBACKER ET AL  2,763,098
MACHINE FOR APPLYING TERMINALS TO GLASS TUBES
Filed June 2, 1953  2 Sheets-Sheet 2
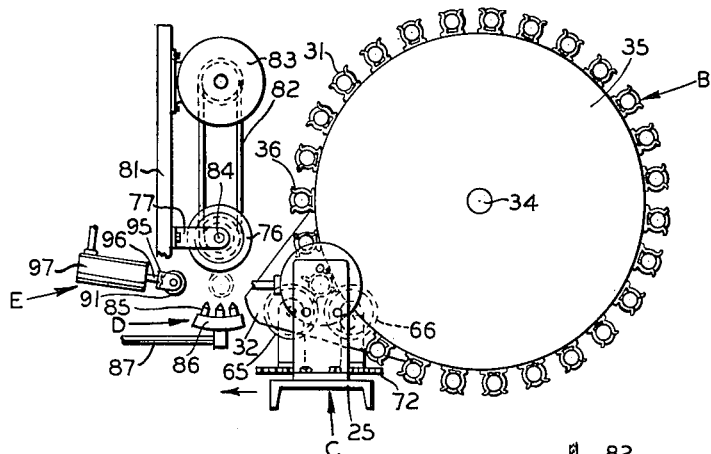
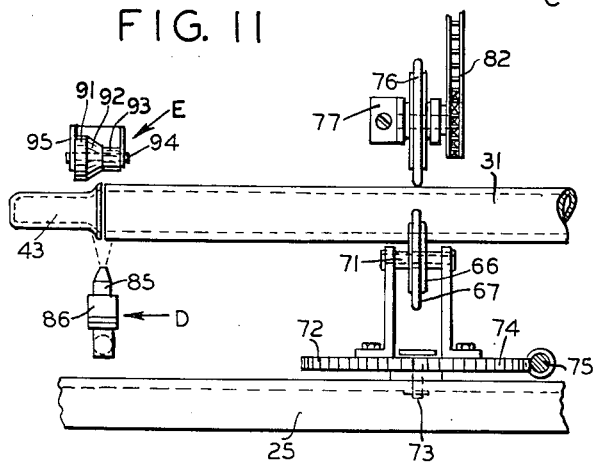
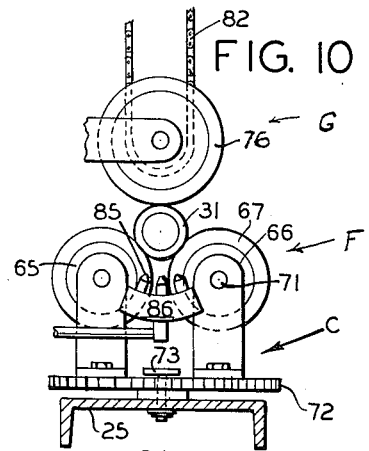
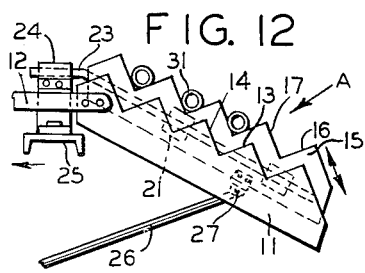
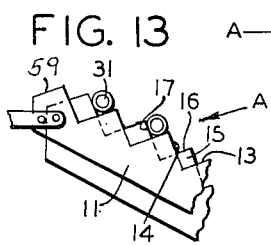
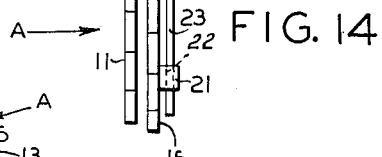
INVENTOR.
MILES PENNYBACKER
CHARLES A. SIMPSON
BY John P. Chandler
their ATTORNEY.

United States Patent Office 2,763,098
Patented Sept. 18, 1956

2,763,098

MACHINE FOR APPLYING TERMINALS TO GLASS TUBES

Miles Pennybacker, Westport, and Charles A. Simpson, Norwalk, Conn.; said Simpson assignor to said Pennybacker Application June 2, 1953, Serial No. 359,154

8 Claims. (Cl. 49—2)

This invention relates to a novel apparatus for applying terminals or closures in sealed relation to the ends of tubular envelopes for electric incandescent and discharge lamps and relates more particularly to an automatic machine for simultaneously sealing closure members to both ends of an elongated tube while the latter is in a horizontal position.

An important object of the invention is the provision of a relatively inexpensive machine which simultaneously affixes a glass closure element or electrode to each end of a tubular glass envelope and wherein a highly satisfactory seal is achieved regardless of fairly wide variations in tube diameters.

Yet another object of the invention is to provide novel tube and electrode rotating means wherein longitudinal creeping of the tube is either wholly eliminated or at least reduced to a negligible and substantially harmless extent of travel, and wherein the electrodes are supported in rotatable chucks or collets which have low inertia and low friction and which may, if desired, be independently rotated at a sufficient rate of speed to allow the glass at the ends of the tube, when it becomes molten, to pick up the closures and impart conjoint rotation thereto. In view of the viscosity of the molten glass in the meeting annular faces of the tube and electrodes, independent rotation of the electrodes is not entirely necessary. If the electrodes are driven it is not necessary to drive them at the same speed as the tube is rotated.

A further object of the invention is to provide a desired measure of reciprocating axial movement of the electrode or other closure relative to the tube to effectively "work" the seal, the motion being imparted to the electrode by means of an air cylinder controlling motion of the chucks or collets in which the electrodes are supported. By employing varying air pressures in this cylinder the use of barrel cams and other expensive equipment to accomplish the result is eliminated. By employing air pressure rather than cams and other moving machine elements there is provided a greater measure of flexibility in adjusting the machine for lamps of different lengths.

One difficulty always experienced in machine sealing of electrodes to tubes is occasioned by the varying diameters of the tubes as well as the electrodes. It is possible to obtain tubes of relatively uniform diameter but the cost is considerably higher than for ordinary tubes. By rotating both the tubes and the electrodes in the novel manner employed in the present apparatus it is possible to secure a substantially perfect seal by employing shaping rollers to form the meeting ends of the electrodes and the tube and thus eliminating the entire operation of "necking" the ends of the blank.

Another object of the invention is to provide an improved conveyor structure for successively positioning the tubes in position to be operated upon.

In the drawings:

Fig. 1 is a top plan view showing the principal operating parts of the machine of the present invention;

Fig. 2 is an enlarged broken detailed plan view of the left-hand end of the movable bed assembly;

Fig. 3 is a side elevation of the electrode for the left-hand end of the tube;

Fig. 4 is a side elevation of the electrode for the right-hand end of the tube;

Fig. 5 is a broken plan view showing the position of the tube and electrode after the latter has been picked up by the collet and before the tube and electrode are moved to sealing position;

Fig. 6 shows the position of the same elements as they leave the positioning baffle with a small space therebetween;

Fig. 7 shows the seal completed between the tube and the electrode;

Fig. 8 is a horizontal section taken through the air cylinder which controls longitudinal and reciprocating movement of the electrode and also showing the electrode rotating means;

Fig. 9 is an end elevation of the machine and showing the movable bed assembly, the feed wheel for the electrodes, the tube supporting and rotating means, the multi-flame heating means and the shaping roller assembly;

Fig. 10 is an enlarged section taken on line 10—10 of Fig. 1 and showing certain details of the tube rotating and heating means;

Fig. 11 is a section taken on line 11—11 of Fig. 1;

Fig. 12 is a side elevation of the tube feeding conveyor;

Fig. 13 shows a second position of the conveyor parts;

Fig. 14 is a broken front elevation of the conveyor.

The essential operating parts of the machine of the present invention include a tube conveyor A, a rotatable electrode feed assembly B, a movable bed assembly C, tube heating means D, a shaping roller assembly E, roller tube supporting assemblies F and tube rotative means G. Elements B, D, E and F are substantially duplicated at each end of the machine.

Certain of the fixed and movable parts are mounted on a frame 10 which is only shown fragmentarily. The conveyor assembly A includes a plurality of fixed members 11 of stepped construction (Figs. 12, 13 and 14) which are rigidly secured at their upper ends to the frame by means of brackets 12. Each of these members are diagonally disposed and have, on their upper edges, alternate rearwardly and downwardly inclined surfaces 13 and rearwardly and upwardly inclined surfaces 14, the latter being at substantially right angles to surfaces 13.

The conveyor further includes a plurality of movable members 15 having similarly shaped generally horizontal and vertical upper edge sections 16 and 17. Movable members 15 carry fixed blocks 21 on their inner surfaces having bearing openings 22 which are generally parallel to the major axes of said members and in which rods 23 are positioned for sliding movement. The rear terminals of these rods are rigidly mounted by means of brackets 24 on the upper surface of channelled beam 25 which is slidable on frame member 18 (Fig. 2) and which is the main support for the component parts of the movable bed assembly C. Said rear terminals of rods 23 are horizontal (Fig. 12) and their forward sections are downwardly inclined and are generally parallel with fixed conveyor members 11. Travel of the lower or forward ends of movable conveyor members 15 is controlled by means of rods 26 (Fig. 12) whose forward ends are pivoted at 27 to the movable conveyor members and whose rear terminals are pivoted to the frame. These rods, which are several feet long, restrict the motion of members 15 to a large radius arc, which is substantially a straight line parallel to the inclined surfaces 14, as is indicated by the double arrows, Fig. 12. When bed 25 moves rearwardly the inclined rods 23 slide through the blocks 21 forcing the movable members 15 to move downwardly along the large radius arc described by pivots 27 at the ends of rods 26.

It will accordingly be seen that as the movable bed assembly travels forwardly to pick up the electrodes, the tubes 31 which have previously been fed by manual means or otherwise to the steps of the fixed conveyor members are advanced rearwardly step by step due to the generally upward and rearward intermittent travel of the movable conveyor members.

The tubes 31 have previously been cut to a length which is precisely equal to the distance between the inner faces of two fixed baffle or positioning plates 32 for the tubes and the electrodes and which are rigidly mounted on forwardly extending brackets 33 secured at their rear ends to an upward extension (not shown) of the frame, which brackets support the electrode feed assembly B.

Each of these brackets provides a support for a stub shaft 34 for each of the electrode feed wheels 35. The outer periphery of each feed wheel is provided with a plurality of electrode holders comprising spring clips 36 and the electrodes are manually or automatically placed in these clips. The wheels are freely journaled on the stub shafts and each wheel carries a ratchet wheel 37 keyed thereto and step-by-step rotation is imparted to the ratchet wheel by means of a pawl drive 41 which is intermittently driven by the piston of an air cylinder (not shown) in order to successively index the electrodes to pick-up position.

The opposed outer faces of baffle plates 32 are employed to properly position the inner ends of the electrodes which are moved against said faces when the chucks move inwardly to receive the electrodes. The forward ends of these baffle plates may be bent inwardly as shown at 42. The electrodes are fed to the clips 36 and they may be pushed against the baffle plates although this is not necessary since the inwardly moving chucks do this.

The electrodes 43 and 44 are shown in Figs. 3 and 4, respectively, and they are similar except that one has lead-in wires 45 and an evacuating stem 46. The main body section of the electrodes is of lesser diameter than the tube and they have outwardly flared inner terminal portions 47 of substantially the same diameter as the tube.

The movable bed assembly C will now be described. The beam 25 is slidably mounted by suitable means (not shown) for forward and rearward travel and driving movement is imparted by an air cylinder 51 rigidly secured to the frame and provided with a piston rod 52 secured to a bracket on the beam.

Each electrode is received in an opening 53 in a slotted chuck or collet 54 which is freely journalled on a piston rod 55 carrying a piston 56 (Fig. 8) at its inner end. The cylindrical recess or socket in the chuck which receives the closure element is long enough to receive the longest closure and still have some space to spare. The chuck, moving inwardly moves the closure as far as is dictated by the outer surface of baffle plate 32. The slots 58 in each chuck are provided to give a springy collet-like action against the side walls of the closure element. The piston is mounted for reciprocating movement in a cylinder 57 having an air inlet port 61 at the rear end of the cylinder and another air inlet port 60 at the forward end. A compression spring 62 is carried concentrically of the piston rod. During a cycle of operation 15 pounds of air pressure is introduced into the cylinder through port 61 and the chuck moves forwardly to closure pick-up position (Fig. 5). The spring acts merely as a stop since this pressure is not sufficient to compress the spring. This pressure is maintained when the chuck leaves the baffle (Fig. 6). After the terminals of the glass become molten, 90 pounds air is introduced compressing the spring and making the faces contact. Working of the seal is effected by alternately applying and venting the 90 pounds air. Finally, when the seal cools sufficiently to set, air is applied through port 60 causing the chuck to withdraw from the electrode.

The chuck should have a very low inertia and low friction so as to rotate with substantially complete freedom. In this fashion any drive for the chuck can be eliminated and the moment the terminals to be joined engage each other the positively driven tube immediately imparts conjoint rotation to the closure element and this rotation is maintained throughout the heating cycle due to the viscosity of the molten glass.

In the drawings, however, a small air motor 63 is shown for turning the chuck at a speed which may be less or greater than the speed of rotation of the tube. This driving influence on the chuck must be so gentle that it does not prevent the chuck from assuming the speed of the tube when the molten glass faces make contact.

When the bed moves forwardly, thus advancing the empty support rollers to pick a tube from the step conveyor, the chuck opening is aligned with a fresh electrode in feed wheel 35. Air under pressure is now introduced into the cylinder through port 61 which advances the chuck to pick up the electrode.

The tube supporting assembly F includes a pair of non-driven, lower rollers 65 and 66 preferably having resilient rings 67 thereon. These rollers are journalled on shafts 71 mounted on a plate 72 centrally pivoted on beam 25 by a pivot pin 73. Means are provided for rotating plate 72 to an adjusted, fixed position and these means may include worm gear teeth 74 formed on the outer periphery of the plate which are engaged by a manually turned worm 75 journalled on the beam. The tube rotating assembly G includes an upper driving wheel 76, also resiliently covered which is journalled in a bracket 77 on a vertical portion 81 of the frame and is driven by a chain 82 connected with a motor 83.

The shaft 84 rotates on a fixed axis and if the lower supporting wheels 65 and 66 are properly adjusted relative to the tube which they support there will be no longitudinal creep of the tube. If creep develops, however, the two plates 72 carrying the lower supporting wheels 65 and 66 may be suitably adjusted until no travel of the tube is produced.

The frame carries the tube heating assembly D which comprises a multi-jet gas heater wherein the jets 85 are radially mounted on a curved header 86 to which gas is supplied through feed tube 87.

The shaping roller assembly E comprises a roller 91 formed of carbon which is provided with a central conical portion 92 and an inner end portion 93. The roller is mounted on a shaft 94 mounted in a bracket 95 secured to the forward end of a piston rod 96 mounted for sliding movement in air cylinder 97.

The single burner station employing a multi-jet gas heating element with three degrees of heat for applying the preheating fire to the tube and electrodes, for applying sealing fire and for thereafter applying the annealing fire, has been found a convenient arrangement for the machine of the present invention. It will be understood, however, that two or more stations may be employed for these three heating operations if it is desired to speed up the time cycle.

In the embodiment of the machine which is illustrated in the drawings, most of the moving parts are actuated by air pressure, either by the use of pistons operating in cylinders or by air motors. An electric motor is employed for the tube revolving assembly, magnetic and solenoid valves are employed for the gas supply and the air pressure in cylinder 57 and the other cylinders. All of the motors, whether air, electric or otherwise are controlled, during a cycle of operation, by a conventional electric cycle timer (not shown) which is common in the art and which is available in a variety of forms.

The time cycle for the machine may be about 30 seconds and if the latter is used a cycle timer provided with a camshaft turning once each 30 seconds is employed. When these cycle timers are supplied by the manufacturer the cams are generally set at random and the user makes his own adjustment by simply loosening a single nut on the cam-shaft. An appropriate number of circuits are then employed in order to start and stop the motors during a cycle of operation.

During operation of the machine the tubes, which have been previously cut to length, are manually or automatically fed to the conveyor structure. Because of the rearward inclination of the tube supporting surfaces 13—16 on the conveyor structure the tubes roll rearwardly to walls 14—17 on each successive step and the leading tube finally rolls rearwardly over upper surfaces 59 of the fixed member 11. Electrodes are supplied to the electrode feed wheels and the operation is ready to commence. A small supply of gas is constantly flowing out of the heating nozzles to act as a pilot flame. As the leading tube rolls rearwardly over surfaces 59 the bed has moved forwardly and the tube is deposited on lower rollers 65 and 66. At the moment the bed assembly has reached its maximum forward position chucks 54 are axially aligned with the leading electrodes 43 and 44. The 15 pound air pressure is now applied to cylinders 57 through ports 61, driving pistons 58 and chucks 54 inwardly to pick up the electrodes (Fig. 5).

The bed assembly now travels rearwardly with a space between the electrode and tube (Fig. 6). When the bed assembly reaches the rearward position of Fig. 10 rotation of drive rollers 76 commences and the heat from the pilot flame removes the chill from the glass in a few seconds at which time additional gas is fed to the burners for the preheating operation which may be timed for 5–7 seconds.

The sealing fire is now applied by increasing the gas flow by stages to increase the glass temperature about 30° C. per second until a temperature of about 600° C. is obtained. If air motors 63 are employed to rotate the chucks the electrodes will be turning at this stage at some speed which may be higher or lower than the speed of rotation of the tube. Even if pre-spinning is not applied to the electrodes the moment the meeting ends become molten and the parts contact together the viscosity of the glass causes the tube to pick up the electrodes and impart conjoint rotation thereto.

The sealing fire may continue for about 15 seconds and after about 10 seconds of this cycle, and the molten seals have been well worked, the shaping roller assemblies move forwardly and contact the molten glass to shape the exterior periphery. These assemblies are shown in the form of rollers which turn due to their contact with the rotating tube and electrodes. They may, however, be fixed or nonrotating elements which move into contact with the rotating glass members.

During application of the shaping roller air is introduced into the tube 31 through conduit 101 into air tube 46 in electrode 44 (Fig. 4). This air pressure together with the external shaping action of roller 91 gives a desired shape to the seal.

As soon as the roller paddle portion of the cycle is finished rotation of the tube continues for a few seconds at a reduced heat for cooling and setting the seal. The lower heat may be continued for the purpose of annealing the glass or the annealing may be done after the present machine has discharged the completed tube. As soon as the seal has set the movable bed assembly is now moved forwardly to discharge the finished tube, thus completing the cycle. This discharge of the tube may be accomplished by manual or automatic means which form no part of the present invention.

The machine of the persent invention can be employed for sealing various types of tubes such as hot cathode tubes, tubes with re-entrant stems and others. In such instances it will be necessary to substitute for the chuck illustrated a different type of holder for the terminal and to change the springs in air cylinders 57 as well as the air control therefor in order to provide the corresponding movements required.

While one form or embodiment of the invention has been shown and described herein for illustrative purposes, and the construction and arrangement incidental to one specific application thereof have been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

What we claim is:

1. A machine for simultaneously sealing closure elements to opposite ends of a glass tube rotating on a horizontal axis, said machine comprising an elongated frame, a bed slidably mounted on said frame for reciprocating travel at right angles thereto, a plurality of pairs of lower rollers for supporting said tube for rotation during the sealing operation, a plate rotatably mounted on the bed on a vertical axis for supporting each pair of lower rollers, means for rotating said plates to an adjusted fixed position to reduce axial travel of the tube during rotation, an upper roller for each pair of lower rollers and means for driving the upper rollers, rotatable chucks mounted on the bed and having low inertia and friction for supporting the closure elements during the sealing operation, driving means for imparting rotation to the chucks independently of the tube, heating means for the meeting ends of the tube and closure elements, fixed plates to position the tube and the closure elements in their chucks in closely spaced relationship, intermittently rotatable feed wheels provided with clips for supporting the closure elements for delivery to the chucks upon forward movement of the bed, the tube and closure elements being delivered to the heating means upon rearward movement of the bed, and rollers for shaping the seals during the heating operation.

2. A machine for simultaneously sealing closure elements to opposite ends of a glass tube rotating on a horizontal axis, said machine comprising an elongated frame, a bed slidably mounted on said frame for reciprocating travel at right angles thereto, a plurality of pairs of lower rollers for supporting said tube for rotation, supports for the lower rollers rotatably mounted on the bed, means for rotating said supports to an adjusted fixed position to reduce axial travel of the tube during rotation, an upper roller for each pair of lower rollers and means for driving at least one of the rollers to rotate the tube during the sealing operation, rotatable chucks mounted on the bed for supporting the closure elements during the sealing operation, heating means for fusing the meeting ends of the tube and closure elements, means for delivering the closure elements to the chucks upon forward movement of the bed, the tube and closure elements being delivered to the heating means upon rearward movement of the bed, and a conduit for delivering air under pressure into the tube after the initial seal has been effected.

3. A machine for simultaneously sealing closure elements to opposite ends of a glass tube rotating on a horizontal axis, said machine comprising an elongated frame, a bed slidably mounted on said frame for reciprocating travel at right angles thereto, a plurality of pairs of rollers for supporting said tube for rotation, means for driving at least one of said rollers to rotate the tube during the sealing operation, rotatable chucks mounted on the bed and having low inertia and friction for supporting the closure elements during the sealing operation, heating means for applying varying degrees of heat to the meeting ends of the tube and closure elements, a conveyor to deliver the tube to the rollers and feeding means to deliver the closure elements to the chucks upon forward movement of the bed, the tube and closure elements being delivered to the heating means upon rearward movement of the bed, and means associated with one of the chucks for introducing air under pressure into the tube after the initial seal has been effected.

4. A machine for simultaneously sealing closure elements to opposite ends of a glass tube rotating on a horizontal axis, said machine comprising an elongated frame, a bed slidably mounted on said frame for reciprocating travel at right angles thereto, a plurality of pairs of lower rollers for supporting said tube for rotation, a plate rotatably mounted on the bed on a vertical axis for supporting each pair of lower rollers, means for rotating said plates to an adjusted fixed position to reduce axial travel of the tube during rotation, an upper roller mounted on the frame for each pair of lower rollers and means for driving one of the rollers to impart rotation to the tube during the sealing operation, rotatable chucks mounted on the bed and having low inertia and friction for supporting the closure elements during the sealing operation, heating means for the meeting ends of the tube and closure elements, fixed plates to position the tube, and the closure elements in their chucks at the ends of the tube, intermittently rotatable feed wheels provided with means for supporting the closure elements for delivery to the chucks upon forward movement of the bed, the tube and closure elements being delivered to the heating means upon rearward movement of the bed.

5. A machine for simultaneously sealing closure elements to opposite ends of a glass tube rotating on a horizontal axis, said machine comprising an elongated frame, a bed slidably mounted on said frame for reciprocating travel at right angles thereto, a plurality of upper and lower rollers carried on shafts for supporting said tube for rotation, certain of said shafts being carried on the bed and other of said shafts being carried on the frame, means for varying the angle of said shafts relative to the tube, to an adjusted fixed position to reduce axial travel of said tube during rotation, means for driving at least one of the rollers to rotate the tube during the sealing operation, rotatable chucks mounted on the bed and having low inertia and friction for supporting the closure elements at the ends of the tube during the sealing operation, means for moving the chucks toward and away from the ends of the tube when the glass becomes molten to work the seal, heating means for the meeting ends of the tube and closure elements, and means to position the tube on the supporting rollers and the closure elements at the ends of the tube upon forward movement of the bed, the tube and closure elements being delivered to the heating means upon rearward movement of the bed.

6. A machine for simultaneously sealing electrodes to opposite ends of a glass tube, said machine comprising a frame, a bed slidably mounted on the frame which is movable to one position to pick up the tube and electrodes and movable to another position for sealing, a pair of fixed spaced plates secured to the frame and whose inner faces contact the ends of the tube and whose outer faces contact the inner ends of the electrodes to position the work, rollers for supporting and rotating the tube, a multi-stage heating element carried by the frame for heating the meeting ends of the tube and electrodes, chucks for supporting the electrodes during heating and a conduit for delivering air under pressure into the tube after the seals become molten.

7. A machine for simultaneously sealing closure elements to opposite ends of a rotating glass tube, said machine comprising a frame, a bed slidably mounted on the frame which is forwardly movable to pick up the tube and closure elements and rearwardly movable to tube rotating position, tube feeding means carried by the frame and for the closure elements feeding means carried by the frame, a pair of fixed, spaced plates whose inner faces contact the ends of the tube and whose outer faces are contacted by the closure elements to position the tube and the closure elements at the ends of the tube, a plurality of pairs of lower rollers on the bed for supporting the tube during rotation, supports for each pair of rollers which are rotatable to an adjusted fixed position to eliminate tube travel during rotation, upper driven rollers on the frame which drive the tube, multistage heating elements carried by the frame for fusing the meeting ends of the tube and closure elements and chucks carried by the bed for supporting the closure elements during heating.

8. A machine for simultaneously sealing closure elements to opposite ends of a glass tube rotating on a horizontal axis, said machine comprising an elongated frame, a bed slidably mounted on said frame for reciprocating travel at right angles thereto, rollers on the bed and at least one roller on the frame for supporting said tube for rotation during the sealing operation, and means for driving at least one of said rollers, rotatable chucks mounted on the bed and having low inertia and friction for supporting the closure elements during the sealing operation, heating means for the meeting ends of the tube and closure elements, fixed plates secured to the frame to position the tube on the supporting rollers and the closure elements in their chucks in closely spaced relationship, and means for delivering the closure elements to the chucks and the tube to the rollers upon forward movement of the bed, the tube and closure elements being delivered to the heating means upon rearward movement of the bed.

References Cited in the file of this patent

UNITED STATES PATENTS

| | | |
|---|---|---|
| 1,955,058 | Eden | Apr. 17, 1934 |
| 2,151,840 | Dichter | Mar. 28, 1939 |
| 2,549,762 | Baker et al. | Apr. 24, 1951 |
| 2,575,746 | Cartun | Nov. 20, 1951 |
| 2,618,904 | Gartner | Nov. 25, 1952 |